(12) United States Patent
Kawashima et al.

(10) Patent No.: US 12,444,525 B2
(45) Date of Patent: Oct. 14, 2025

(54) DC MAGNETIC FIELD SUPERCONDUCTING COIL POWER SUPPLY DEVICE

(71) Applicant: TERAL INC., Fukuyama (JP)

(72) Inventors: Hiroshi Kawashima, Fukuyama (JP); Shiro Sugimoto, Fukuyama (JP); Tetsuya Ito, Fukuyama (JP)

(73) Assignee: TERAL INC., Fukuyama (JP)

( * ) Notice: Subject to any disclaimer, the term of this patent is extended or adjusted under 35 U.S.C. 154(b) by 20 days.

(21) Appl. No.: 18/561,494

(22) PCT Filed: Nov. 30, 2021

(86) PCT No.: PCT/JP2021/043991
§ 371 (c)(1),
(2) Date: Nov. 16, 2023

(87) PCT Pub. No.: WO2022/249514
PCT Pub. Date: Dec. 1, 2022

(65) Prior Publication Data
US 2024/0371553 A1    Nov. 7, 2024

(30) Foreign Application Priority Data

May 28, 2021 (JP) ................................. 2021-090691

(51) Int. Cl.
*H01F 6/00*    (2006.01)
*H01F 6/06*    (2006.01)

(52) U.S. Cl.
CPC .............. *H01F 6/008* (2013.01); *H01F 6/06* (2013.01)

(58) Field of Classification Search
CPC ............ H01F 6/008; H01F 6/06; H02J 15/00; H02M 3/1555; H02M 3/1586; Y02E 40/60

(Continued)

(56) References Cited

U.S. PATENT DOCUMENTS 5,146,383 A * 9/1992 Logan ..................... H01F 6/003
505/211
5,965,959 A * 10/1999 Gamble .................. H01F 6/005
335/216

(Continued)

FOREIGN PATENT DOCUMENTS

CN    101521083 A * 9/2009
CN    201302893 Y    9/2009

(Continued)

OTHER PUBLICATIONS

Nov. 21, 2023, International Preliminary Report on Patentability issued in the International Patent Application No. PCT/JP2021/043991.

(Continued)

*Primary Examiner* — Sreeya Sreevatsa
(74) *Attorney, Agent, or Firm* — KENJA IP LAW PC

(57) ABSTRACT

Provided is a DC magnetic field superconducting coil power supply device using a superconducting coil at low cost. A DC magnetic field superconducting coil power supply device 1 comprises: a superconducting coil 17; a power supply device 11 configured to supply a DC voltage; a plurality of chopper circuits 13 connected in parallel between one end of the power supply device 11 and one end of the superconducting coil 17; and a controller 18 configured to control the plurality of chopper circuits 13, wherein the controller 18 is configured to operate the plurality of chopper circuits 13 in a time-division manner when charging the superconducting coil 17.

14 Claims, 10 Drawing Sheets

(58) Field of Classification Search
USPC .......................................................... 361/141
See application file for complete search history.

(56) References Cited

U.S. PATENT DOCUMENTS

| | | | |
|---|---|---|---|
| 8,952,667 B2* | 2/2015 | Ohshita | H02M 3/1584 |
| | | | 323/272 |
| 11,005,380 B2* | 5/2021 | Kanda | H02M 3/33561 |
| 2014/0104889 A1* | 4/2014 | Yamada | H02M 3/33573 |
| | | | 363/16 |
| 2015/0035447 A1* | 2/2015 | Kamoi | H05B 45/375 |
| | | | 315/224 |

FOREIGN PATENT DOCUMENTS

| | | | |
|---|---|---|---|
| JP | H05328641 A | | 12/1993 |
| JP | H097819 A | * | 1/1997 |
| JP | 2006332513 A | * | 12/2006 |
| WO | 2011074092 A1 | | 6/2011 |

OTHER PUBLICATIONS

Feb. 8, 2022, International Search Report issued in the International Patent Application No. PCT/JP2021/043991.

Jul. 23, 2024, Notification of Reasons for Refusal issued by the Japan Patent Office in the corresponding Japanese Patent Application No. 2023-523952.

Apr. 7, 2025, the Extended European Search Report issued by the European Patent Office in the corresponding European Patent Application No. 21943147.5.

* cited by examiner

DC MAGNETIC FIELD SUPERCONDUCTING COIL POWER SUPPLY DEVICE

TECHNICAL FIELD

The present disclosure relates to a DC (direct-current) magnetic field superconducting coil power supply device.

BACKGROUND

DC magnetic field generation devices using superconducting coils are conventionally known. In order to generate a high magnetic field by a DC magnetic field generation device using a superconducting coil, a large current needs to flow through the superconducting coil.

A known technique for causing a large current to flow through a superconducting coil involves gradually increasing the current flowing through the superconducting coil to charge the superconducting coil and cause the large current to flow through the superconducting coil.

For example, WO 2011/074092 A1 (PTL 1) discloses a technique that repeatedly turns on and off a switch installed between an excitation transformer capable of supplying current and a superconducting magnet to gradually increase the current flowing through the superconducting magnet.

CITATION LIST

Patent Literature

PTL 1: WO 2011/074092 A1

SUMMARY

Technical Problem

When charging a superconducting coil, current is usually supplied from a power supply device to the superconducting coil via a lead. Since a large current needs to be supplied, the power supply device and the lead are required to be capable of handling large currents. However, power supply devices and leads capable of handling large currents are costly.

It could therefore be helpful to provide a DC magnetic field superconducting coil power supply device used in a DC magnetic field generation device using a superconducting coil at low cost.

Solution to Problem

A DC magnetic field superconducting coil power supply device according to the present disclosure comprises: a superconducting coil; a power supply device configured to supply a DC voltage; a plurality of chopper circuits connected in parallel between one end of the power supply device and one end of the superconducting coil; and a controller configured to control the plurality of chopper circuits, wherein the controller is configured to operate the plurality of chopper circuits in a time-division manner when charging the superconducting coil.

In the DC magnetic field superconducting coil power supply device according to the present disclosure, the controller may be configured to operate each of the plurality of chopper circuits once during one cycle.

In the DC magnetic field superconducting coil power supply device according to the present disclosure, each of the plurality of chopper circuits may comprise: a first switch and an inductor configured to connect the one end of the power supply device and the one end of the superconducting coil in series; and a second switch configured to connect a node between the first switch and the inductor and a ground, and the ground may be a node connecting an other end of the power supply device and an other end of the superconducting coil.

In the DC magnetic field superconducting coil power supply device according to the present disclosure, the first switch and the second switch may each be a MOSFET.

In the DC magnetic field superconducting coil power supply device according to the present disclosure, the controller may be configured to adjust a duty ratio when operating each of the plurality of chopper circuits.

The DC magnetic field superconducting coil power supply device according to the present disclosure may further comprise a low-resistance switch configured to short-circuit both ends of the superconducting coil, and the controller may be configured to turn on the low-resistance switch to short-circuit both ends of the superconducting coil, when a current flowing through the superconducting coil is greater than or equal to a predetermined threshold.

In the DC magnetic field superconducting coil power supply device according to the present disclosure, the low-resistance switch may have a structure in which a plurality of parallel circuits each composed of a MOSFET and a diode are connected in parallel.

In the DC magnetic field superconducting coil power supply device according to the present disclosure, the superconducting coil and the plurality of chopper circuits may be installed inside a cooling container.

In the DC magnetic field superconducting coil power supply device according to the present disclosure, the cooling container may have a first region and a second region that is lower in cooling temperature setting than the first region, the plurality of chopper circuits may be installed in the first region, and the superconducting coil may be installed in the second region.

The DC magnetic field superconducting coil power supply device according to the present disclosure may further comprise two first leads connected to respective two output terminals of the power supply device.

In the DC magnetic field superconducting coil power supply device according to the present disclosure, the superconducting coil may comprise a plurality of superconducting coils connected in parallel, and the DC magnetic field superconducting coil power supply device may further comprise: a plurality of selection switches each connected between a different one of the plurality of superconducting coils and the plurality of chopper circuits; and a freewheeling diode configured to connect the ground and a node between the plurality of chopper circuits and the plurality of selection switches.

The DC magnetic field superconducting coil power supply device according to the present disclosure may further comprise a third switch connected in parallel with the freewheeling diode.

In the DC magnetic field superconducting coil power supply device according to the present disclosure, the superconducting coil may comprise a plurality of superconducting coils connected in parallel, the DC magnetic field superconducting coil power supply device may further comprise a plurality of selection switches each connected between a different one of the plurality of superconducting coils and the plurality of chopper circuits, and each of the plurality of chopper circuits may further comprise a freewheeling diode connected in parallel with the inductor.

The DC magnetic field superconducting coil power supply device according to the present disclosure may further comprise a fourth switch connected in parallel with the freewheeling diode.

The DC magnetic field superconducting coil power supply device according to the present disclosure may further comprise: a plurality of current blocking diodes each configured to connect one end of a different one of the plurality of superconducting coils and one end of a load provided outside the DC magnetic field superconducting coil power supply device; and a plurality of fifth switches each configured to connect an other one of the different one of the plurality of superconducting coils and an other one of the load.

Advantageous Effect

It is thus possible to provide a DC magnetic field superconducting coil power supply device using a superconducting coil at low cost.

DETAILED DESCRIPTION

Embodiments of the present disclosure will be described below with reference to the drawings.

Figure 1:
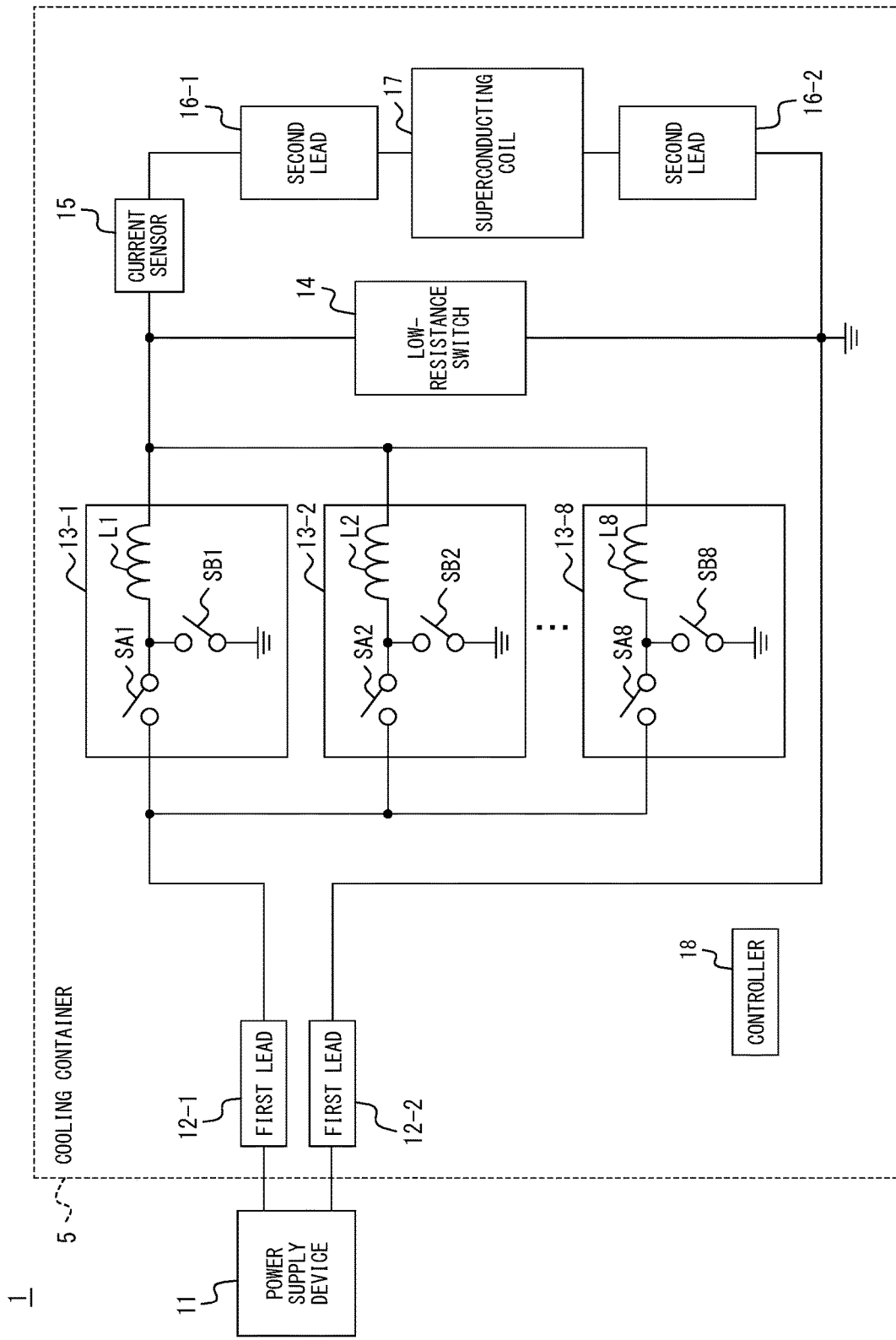
FIG. 1 is a diagram illustrating the structure of a DC magnetic field superconducting coil power supply device according to an embodiment of the present disclosure.

FIG. 1 is a diagram illustrating the structure of a DC magnetic field superconducting coil power supply device 1 according to an embodiment of the present disclosure.

The DC magnetic field superconducting coil power supply device 1 includes a power supply device 11, first leads 12-1 to 12-2, chopper circuits 13-1 to 13-8, a low-resistance switch 14, a current sensor 15, second leads 16-1 to 16-2, a superconducting coil 17, and a controller 18.

Hereafter, the first leads 12-1 and 12-2 may be simply referred to as "first leads 12" when there is no need to distinguish them.

Hereafter, the chopper circuits 13-1 to 13-8 may be simply referred to as "chopper circuits 13" when there is no need to distinguish them.

Hereafter, the second leads 16-1 to 16-2 may be simply referred to as "second leads 16" when there is no need to distinguish them.

The first leads 12, the chopper circuits 13, the low-resistance switch 14, the current sensor 15, the second leads 16, the superconducting coil 17, and the controller 18 are installed inside a cooling container 5.

The cooling container 5 is a device capable of cooling the inside to a low temperature. For example, the cooling container 5 can cool the inside to about 20 K.

The power supply device 11 is a device capable of supplying a DC voltage. The power supply device 11 may include, for example, an AC/DC converter that converts an AC voltage supplied from a commercial power supply or the like into a DC voltage. The DC voltage supplied by the power supply device 11 may be, for example, about 6 V.

Two output terminals of the power supply device 11 are connected to the first leads 12-1 and 12-2. One output terminal of the power supply device 11 is connected to the plurality of chopper circuits 13-1 to 13-8 via the first lead 12-1. The other output terminal of the power supply device 11 is connected to the low-resistance switch 14 and the second lead 16-2 via the first lead 12-2. The second lead 16-2 and the low-resistance switch 14 are connected to the ground of each chopper circuit 13.

The first leads 12 are conductors through which current can flow. The first leads 12 may be, for example, normal-conducting current leads.

The plurality of chopper circuits 13-1 to 13-8 are connected in parallel between one end of the power supply device 11 and one end of the superconducting coil 17. In this embodiment, the term "connected" means not only direct connection but also indirect connection.

One end of each of the plurality of chopper circuits 13-1 to 13-8 connected in parallel is connected to one end of the power supply device 11 via the first lead 12-1. The other end of each of the plurality of chopper circuits 13-1 to 13-8 connected in parallel is connected to one end of the superconducting coil 17 via the current sensor 15 and the second lead 16-1. The ground of each chopper circuit 13 is connected to the low-resistance switch 14 and connected to the other end of the superconducting coil 17 via the second lead 16-2.

Although this embodiment describes a structure in which eight chopper circuits 13-1 to 13-8 are connected in parallel as an example, the number of chopper circuits 13 connected in parallel is not limited to eight. The number of chopper circuits 13 connected in parallel may be any number of two or more.

The chopper circuit 13-1 includes a first switch SA1, a second switch SB1, and an inductor L1. Likewise, the chopper circuit 13-2 includes a first switch SA2, a second switch SB2, and an inductor L2. Likewise, the chopper circuit 13-8 includes a first switch SA8, a second switch SB8, and an inductor L8. The chopper circuits 13-3 to 13-7 are omitted in FIG. 1.

Since the chopper circuits 13-1 to 13-8 have the same structure, the chopper circuit 13-1 will be described below as an example.

The first switch SA1 and the inductor L1 in the chopper circuit 13-1 connect one end of the power supply device 11 and one end of the superconducting coil 17 in series. The second switch SB1 connects a node between the first switch SA1 and the inductor L1 and the ground.

When the first switch SA1 is on and the second switch SB1 is off, the chopper circuit 13-1 charges the superconducting coil 17 and the inductor L1 with the current supplied from the power supply device 11. When the first switch SA1 is off and the second switch SB1 is on, the inductor L1 in the chopper circuit 13-1 discharges to supply current to the superconducting coil 17.

The first switch SA1 and the second switch SB1 in the chopper circuit 13-1 are controlled by the controller 18.

Figure 2:
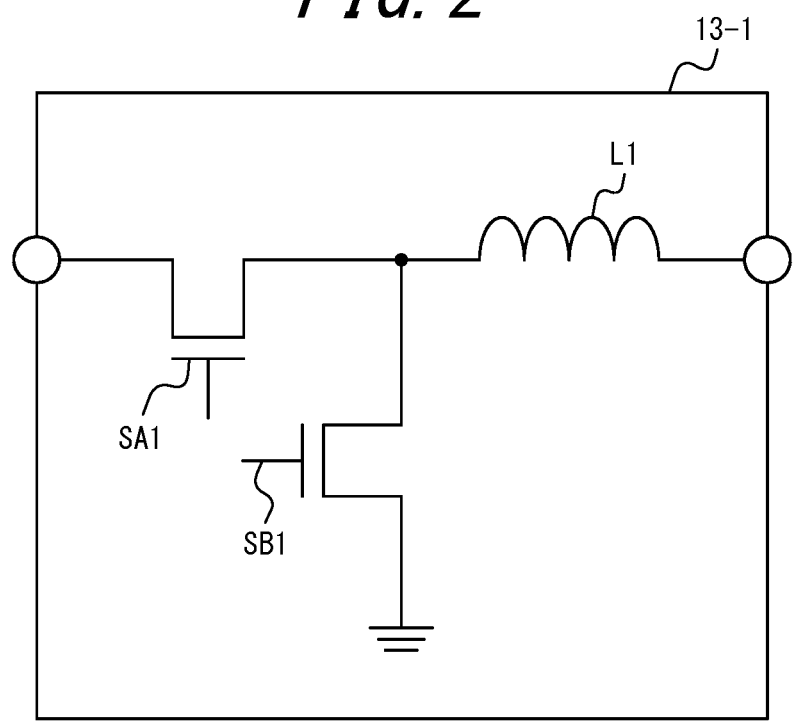
FIG. 2 is a diagram illustrating an example of the structure of a chopper circuit.

FIG. 2 illustrates an example of the circuit structure of the chopper circuit 13-1. As illustrated in FIG. 2, the first switch SA1 and the second switch SB1 may be MOSFETs. The first switch SA1 may be an N-channel MOSFET. The second switch SB1 may be an N-channel MOSFET.

In the case where the first switch SA1 and the second switch SB1 are MOSFETs, the gates of the MOSFETs are controlled by the controller 18.

As a result of the first switch SA1 and the second switch SB1 being MOSFETs, the operation speeds of the first switch SA1 and the second switch SB1 can be increased. As a result of the first switch SA1 and the second switch SB1 being MOSFETs, the conduction loss of each of the first switch SA1 and the second switch SB1 can be reduced because MOSFETs have low on-resistance.

Since the chopper circuit 13-1 is installed inside the cooling container 5, the on-resistances of the first switch SA1 and the second switch SB1 are lower than in the case where the chopper circuit 13-1 is installed at room temperature. Since the chopper circuit 13-1 is installed inside the cooling container 5, the series resistance value of the inductor L1 is lower than in the case where the chopper circuit 13-1 is installed at room temperature.

The low-resistance switch 14 is a switch capable of short-circuiting both ends of the superconducting coil 17. One end of the low-resistance switch 14 is connected to one end of the superconducting coil 17 via the current sensor 15 and the second lead 16-1. The other end of low-resistance switch 14 is connected to the other end of the superconducting coil 17 via the second lead 16-2.

Herein, the expression "the low-resistance switch 14 short-circuits both ends of the superconducting coil 17" does not mean that both ends of the superconducting coil 17 are completely short-circuited, but means that the low-resistance switch 14 connects both ends of the superconducting coil 17 with a resistance value less than or equal to a predetermined resistance value. The predetermined resistance value may be, for example, about 0.01 mΩ to 0.1 mΩ.

On/off of the low-resistance switch 14 is controlled by the controller 18. While the superconducting coil 17 is being charged, the low-resistance switch 14 is off. That is, while the superconducting coil 17 is being charged, the low-resistance switch 14 does not short-circuit both ends of the superconducting coil 17. When the charging of the superconducting coil 17 is completed, the low-resistance switch 14 is turned on. That is, when the charging of the superconducting coil 17 is completed, the low-resistance switch 14 short-circuits both ends of the superconducting coil 17.

When the charging of the superconducting coil 17 is completed and the low-resistance switch 14 is turned on, current flows through a closed loop connecting the low-resistance switch 14, the current sensor 15, the second lead 16-1, the superconducting coil 17, and the second lead 16-2. In this state, the superconducting coil 17 can generate a desired DC magnetic field.

Figure 3:
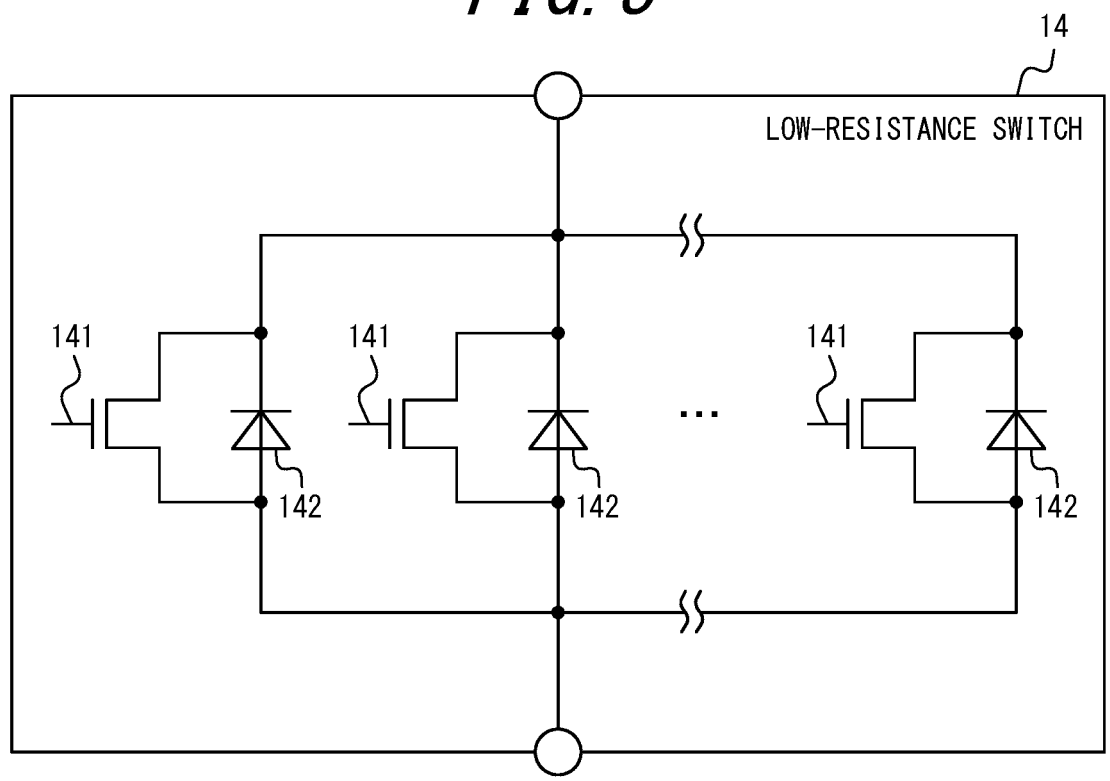
FIG. 3 is a diagram illustrating an example of the structure of a low-resistance switch.

FIG. 3 illustrates an example of the circuit structure of the low-resistance switch 14. The low-resistance switch 14 may have a structure in which a plurality of parallel circuits each composed of a MOSFET 141 and a diode 142 are connected in parallel. For example, the low-resistance switch 14 may have a structure in which ten parallel circuits each composed of the MOSFET 141 and the diode 142 are connected in parallel. The MOSFET 141 may be a circuit element of a type other than MOSFET as long as it is capable of functioning as a switch.

Since the low-resistance switch 14 is installed inside the cooling container 5, the on-resistance of the MOSFET 141 is lower than in the case where the low-resistance switch 14 is installed at room temperature.

As a result of the low-resistance switch 14 including the low-loss MOSFET 141 in this way, the loss when current is flowing through the superconducting coil 17 in the closed loop can be reduced.

The current sensor 15 detects the current flowing through the superconducting coil 17. The current sensor 15 may be, for example, a current transformer (CT).

The second leads 16 are conductors through which current can flow. The second leads 16 may be, for example, superconducting current leads. Since superconducting current leads have low resistance value and high heat insulation property, it is possible to suppress heat transfer to the superconducting coil 17.

The superconducting coil 17 may include a coil made of high-temperature superconducting wire rods. The superconducting coil 17 may be, for example, a non-insulated coil in which a metal tape made of a normal-conducting material having a relatively high resistance is sandwiched between coil-shaped high-temperature superconducting wire rods. As a result of the superconducting coil 17 being a non-insulated coil, degradation in the mechanical properties of the superconducting coil 17 can be prevented. As a result of the superconducting coil 17 being a non-insulated coil, thermal runaway of the superconducting coil 17 can be suppressed to improve the stability.

The controller 18 controls the operations of the chopper circuits 13. The controller 18 controls the operations of the chopper circuits 13-1 to 13-8 by controlling the first switches SA1 to SA8 and the second switches SB1 to SB8.

When charging the superconducting coil 17, the controller 18 operates the plurality of chopper circuits 13-1 to 13-8 in a time-division manner. The control of the plurality of chopper circuits 13-1 to 13-8 by the controller 18 will be described in detail later.

The controller 18 may include a logic IC without including a processor such as a central processing unit (CPU). Alternatively, the controller 18 may include a processor such as a CPU.

If the controller 18 does not include a processor such as a CPU, the reliability of the controller 18 can be improved. If the controller 18 includes a processor such as a CPU, the controller 18 can perform advanced processing.

The operation of charging the superconducting coil 17 in the DC magnetic field superconducting coil power supply device 1 will be described in detail below.

When starting charging the superconducting coil 17, the controller 18 turns off the low-resistance switch 14.

The controller 18 then operates the plurality of chopper circuits 13 in a time-division manner to charge the superconducting coil 17.

Herein, "operating the plurality of chopper circuits 13 in a time-division manner" means that the time of one cycle is divided by the number of chopper circuits 13 and one chopper circuit 13 operates in each divided time. That is, the controller 18 operates each chopper circuit 13 once during one cycle.

In the example illustrated in FIG. 1, the number of chopper circuits 13 is eight. The control of the chopper circuits 13-1 to 13-8 by the controller 18 in the case where the number of chopper circuits 13 is eight will be described below, with reference to the timing chart in FIG. 4.

The controller 18 divides the time of one cycle by 8. In the example illustrated in FIG. 4, the controller 18 operates the chopper circuits 13 in sequence each for the time of ⅛ cycle. One cycle is the time from t1 to t17. The controller 18 operates the chopper circuit 13-1 during the time from t1 to t3. The controller 18 operates the chopper circuit 13-2 during the time from t3 to t5. The controller 18 operates the chopper circuit 13-8 during the time from t15 to t17. The control of the chopper circuits 13-3 to 13-7 is omitted in the timing chart illustrated in FIG. 4.

From t1 to t2, the controller 18 turns on the first switch SA1 and turns off the second switch SB1 in the chopper circuit 13-1. During this time, the controller 18 turns off the first switches SA2 to SA8 and turns on the second switches SB2 to SB8 in the other chopper circuits 13-2 to 13-8.

By this control, from t1 to t2, the inductor L1 in the chopper circuit 13-1 and the superconducting coil 17 are charged with the current supplied from the power supply device 11.

Subsequently, from t2 to t3, the controller 18 turns off the first switch SA1 and turns on the second switch SB1 in the chopper circuit 13-1. During this time, the controller 18 turns off the first switches SA2 to SA8 and turns on the second switches SB2 to SB8 in the other chopper circuits 13-2 to 13-8.

By this control, the inductor L1 charged from t1 to t2 is discharged, and current is supplied from the inductor L1 to the superconducting coil 17. Subsequently, from t3 to t4, the controller 18 turns on the first switch SA2 and turns off the second switch SB2 in the chopper circuit 13-2. During this time, the controller 18 turns off the first switches SA1 and SA3 to SA8 and turns on the second switches SB1 and SB3 to SB8 in the other chopper circuits 13-1 and 13-3 to 13-8.

By this control, from t3 to t4, the inductor L2 in the chopper circuit 13-2 and the superconducting coil 17 are charged with the current supplied from the power supply device 11.

Subsequently, from t4 to t5, the controller 18 turns off the first switch SA2 and turns on the second switch SB2 in the chopper circuit 13-2. During this time, the controller 18 turns off the first switches SA1 and SA3 to SA8 and turns on the second switches SB1 and SB3 to SB8 in the other chopper circuits 13-1 and 13-3 to 13-8.

By this control, the inductor L2 charged from t3 to t4 is discharged, and current is supplied from the inductor L2 to the superconducting coil 17.

The controller 18 repeats this process for the chopper circuits 13-3 to 13-8 sequentially. When the operation of the chopper circuit 13-8 ends, that is, when t17 illustrated in FIG. 4 is reached, the controller 18 returns to the process of operating the chopper circuit 13-1, and repeats the same process.

Figure 4:
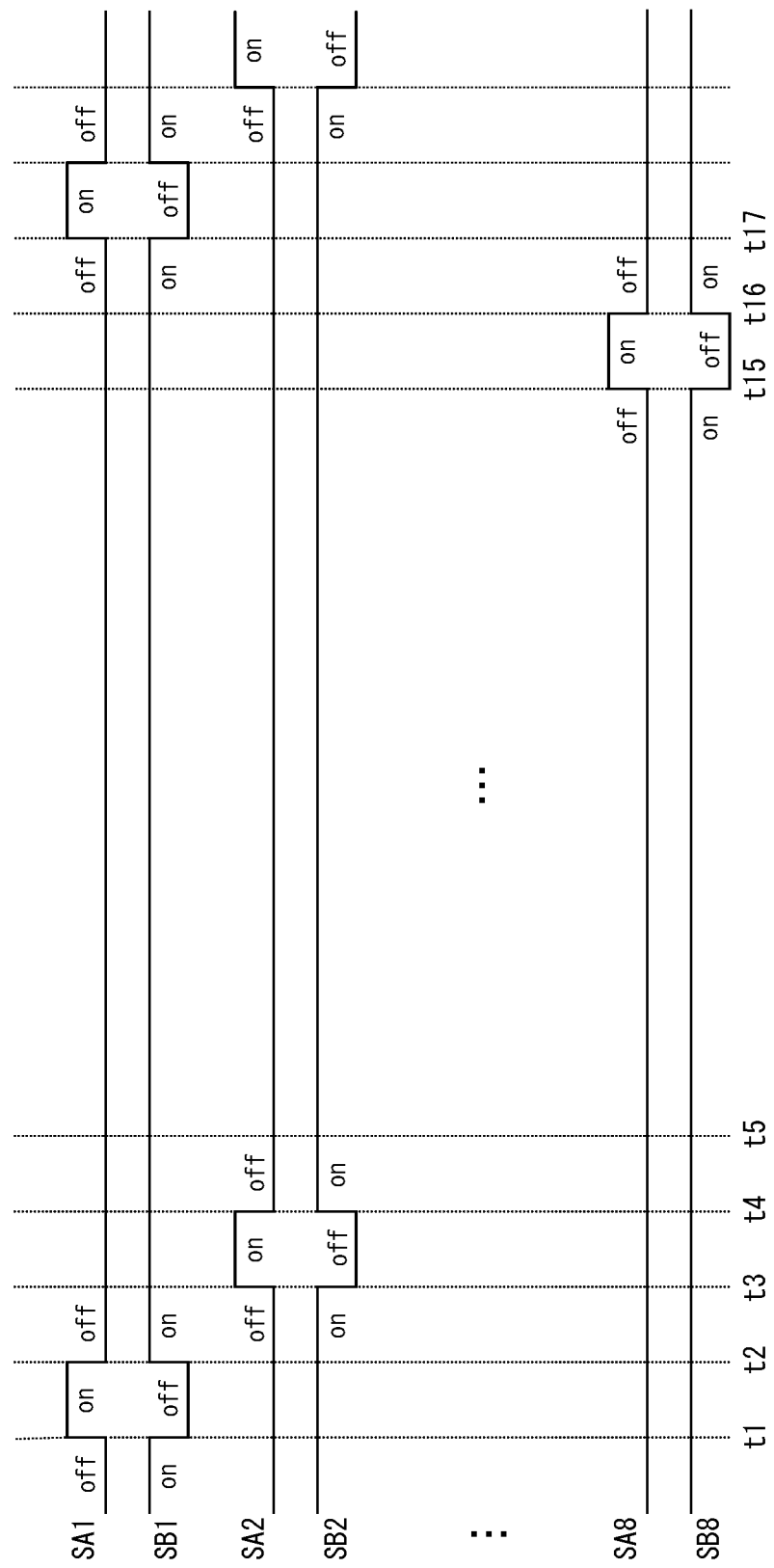
FIG. 4 is a timing chart illustrating an example of on/off timing of switches in each chopper circuit.

In this way, the controller 18 charges the superconducting coil 17 by repeating the process from t1 to t17 in FIG. 4.

While the superconducting coil 17 is being charged, the controller 18 acquires the value of the current flowing through the superconducting coil 17 from the current sensor 15 that detects the current of the superconducting coil 17. In the case where the controller 18 determines that the current flowing through the superconducting coil 17 is greater than or equal to a predetermined threshold, the controller 18 ends the charging process for the superconducting coil 17. In the case where the controller 18 determines that the current flowing through the superconducting coil 17 is greater than or equal to the predetermined threshold, the controller 18 turns on the low-resistance switch 14 to short-circuit both ends of the superconducting coil 17.

The predetermined threshold may be the value of current required to flow through the superconducting coil 17 in order to generate a predetermined DC magnetic field. The predetermined threshold may be, for example, about 300 A.

When the low-resistance switch 14 is turned on, current flows through the closed loop connecting the low-resistance switch 14, the current sensor 15, the second lead 16-1, the superconducting coil 17, and the second lead 16-2. In this state, the superconducting coil 17 generates the desired DC magnetic field.

The DC magnetic field superconducting coil power supply device 1 according to this embodiment charges the superconducting coil 17 by the eight chopper circuits 13 connected in parallel in this way. Therefore, in the case of charging the superconducting coil 17 so that a current of 300 A will flow through the superconducting coil 17, the average current flowing through one chopper circuit 13 is 300 A/8=37.5 A.

Since the chopper circuits 13-1 to 13-8 operate in a time-division manner, the power supply device 11 only needs to be capable of supplying a current of about 37.5 A on average. The power supply device 11 can thus be a low-cost power supply device as compared with a power supply device capable of supplying 300 A.

Moreover, in the case of charging the superconducting coil 17 so that a current of 300 A will flow through the superconducting coil 17, each first lead 12 only needs to be capable of flowing a current of about 37.5 A on average. The first lead 12 can thus be reduced in cross-sectional area as compared with a current lead capable of flowing 300 A. By reducing the cross-sectional area of the first lead 12, it is possible to reduce the amount of heat entering the cooling container 5 from the outside through the first lead 12.

Regarding the chopper circuits 13, too, each chopper circuit 13 only needs to be capable of flowing a current of about 37.5 A on average. The chopper circuit 13 can thus be reduced in size as compared with a chopper circuit capable of flowing 300 A. This eases the installation of the chopper circuits 13 inside the cooling container 5.

After completing the charging process for the superconducting coil 17, the controller 18 may turn off the first switches SA1 to SA8 and the second switches SB1 to SB8 in the chopper circuits 13-1 to 13-8.

Alternatively, after completing the charging process for the superconducting coil 17, the controller 18 may turn off the first switches SA1 to SA8 in the chopper circuits 13-1 to 13-8 and turn on the second switches SB1 to SB8 in the chopper circuits 13-1 to 13-8.

When the second switches SB1 to SB8 in the chopper circuits 13-1 to 13-8 are turned on, the series structure of the inductor L1 and the second switch SB1, the series structure of the inductor L2 and the second switch SB2, . . . , and the series structure of the inductor L8 and the second switch SB8 are connected to the low-resistance switch 14 in parallel, with it being possible to further reduce the resistance value across the low-resistance switch 14 when the low-resistance switch 14 is on. In the case where the resistance value in the series-parallel structure in the on state of the inductors L1 to L8 and the second switches SB1 to SB8 is low, for example, in the case where the inductors L1 to L8 are superconducting coils, the low-resistance switch 14 may be omitted.

The controller 18 can adjust the duty ratio when operating each chopper circuit 13. Taking the chopper circuit 13-1 as an example, the duty ratio is the ratio of the time during which the first switch SA1 is on to the time during which the chopper circuit 13-1 is operating. In detail, in FIG. 4, let TA be the time from t1 to t3 during which the chopper circuit 13-1 is operating, and TB be the time from t1 to t2 during which the first switch SA1 is on. Then, the duty ratio is represented by TB/TA.

By adjusting the duty ratio, the controller 18 can adjust the charging capability for the superconducting coil 17. For example, the controller 18 can maximize the charging capability of the superconducting coil 17 by adjusting the duty ratio to close to 100%.

Figure 5:
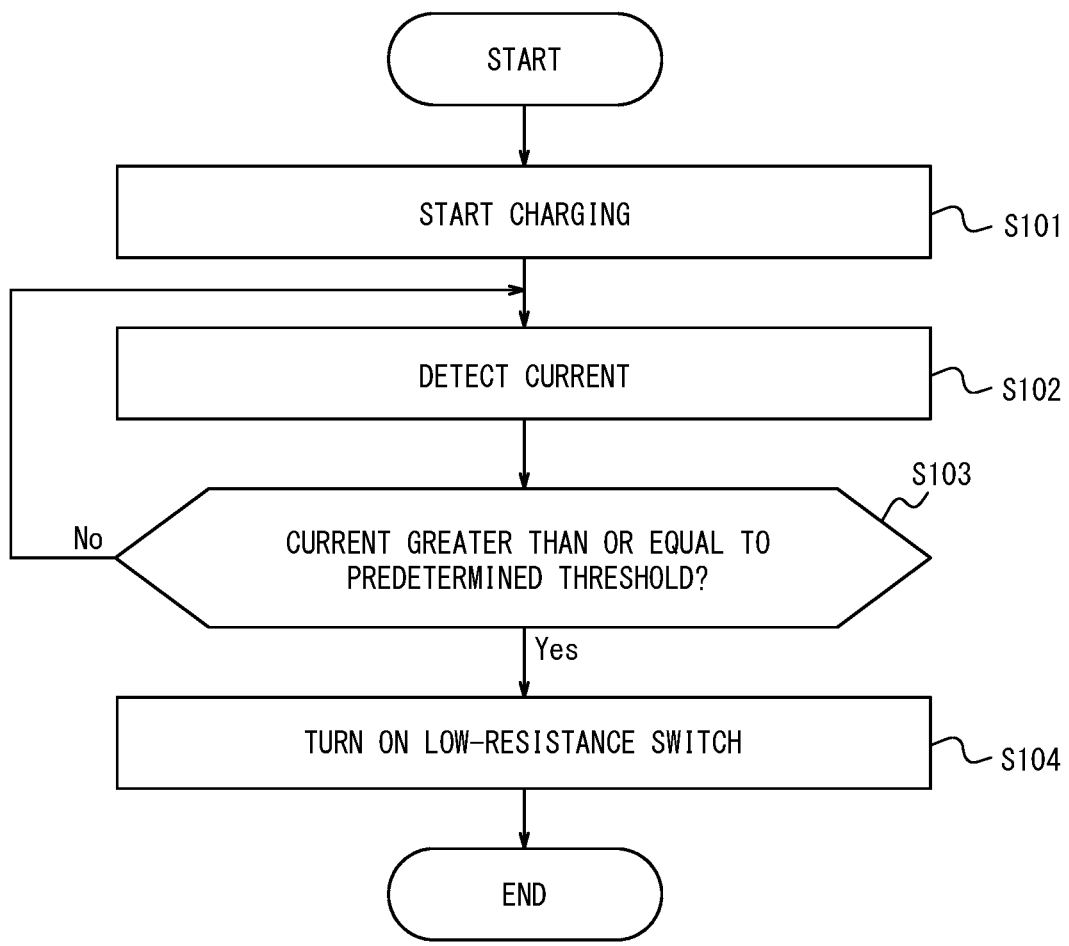
FIG. 5 is a flowchart illustrating an example of the operation of the DC magnetic field superconducting coil power supply device according to an embodiment of the present disclosure.

The operation of the DC magnetic field superconducting coil power supply device 1 will be described below, with reference to the flowchart in FIG. 5.

When charging of the superconducting coil 17 starts, the controller 18 turns off the low-resistance switch 14. The controller 18 also controls the first switches SA1 to SA8 and the second switches SB1 to SB8 in the chopper circuits 13-1 to 13-8 as illustrated in the timing chart in FIG. 4 (step S101).

While the superconducting coil 17 is being charged, the controller 18 acquires the value of the current flowing through the superconducting coil 17 detected by the current sensor 15, from the current sensor 15 (step S102).

The controller 18 determines whether the current flowing through the superconducting coil 17 is greater than or equal to the predetermined threshold (step S103).

In the case where the current flowing through the superconducting coil 17 is less than the predetermined threshold (step S103: No), the controller 18 returns to step S102.

In the case where the current flowing through the superconducting coil 17 is greater than or equal to the predetermined threshold (step S103: Yes), the controller 18 turns on the low-resistance switch 14 (step S104). The controller 18 also stops the operation of charging the superconducting coil 17 by the chopper circuits 13-1 to 13-8.

Superconducting Coil Terminal Voltage Suppression Circuit

The DC magnetic field superconducting coil power supply device 1 may further include a circuit that suppresses application of a high voltage between the terminals of the superconducting coil 17 during charging.

For example, the DC magnetic field superconducting coil power supply device 1 may include a resistor connected in parallel with the superconducting coil 17, as the circuit that suppresses application of a high voltage between the terminals of the superconducting coil 17. Alternatively, the DC magnetic field superconducting coil power supply device 1 may include, for example, a diode connected in parallel with the superconducting coil 17, as the circuit that suppresses application of a high voltage between the terminals of the superconducting coil 17.

In the case where the low-resistance switch 14 has a structure including the MOSFETs 141 as illustrated in FIG. 3, the DC magnetic field superconducting coil power supply device 1 may cause each MOSFET 141 included in the low-resistance switch 14 as the resistor connected in parallel with the superconducting coil 17. For example, when charging the superconducting coil 17, the controller 18 may apply, to the gate of the MOSFET 141 included in the low-resistance switch 14, a lower voltage than when turning on the MOSFET 141, to set the resistance value between the drain and source of the MOSFET 141 to a desired resistance value and cause the MOSFET 141 to function as the resistor connected in parallel with the superconducting coil 17.

Alternatively, in the case where the low-resistance switch 14 has a structure including the MOSFETs 141 as illustrated in FIG. 3, the DC magnetic field superconducting coil power supply device 1 may connect some of the plurality of MOSFETs 141 included in the low-resistance switch 14 reversely, to cause each reversely connected MOSFET 141 to function as the diode connected in parallel with the superconducting coil 17.

Two-Level Cooling of Cooling Container

Figure 6:
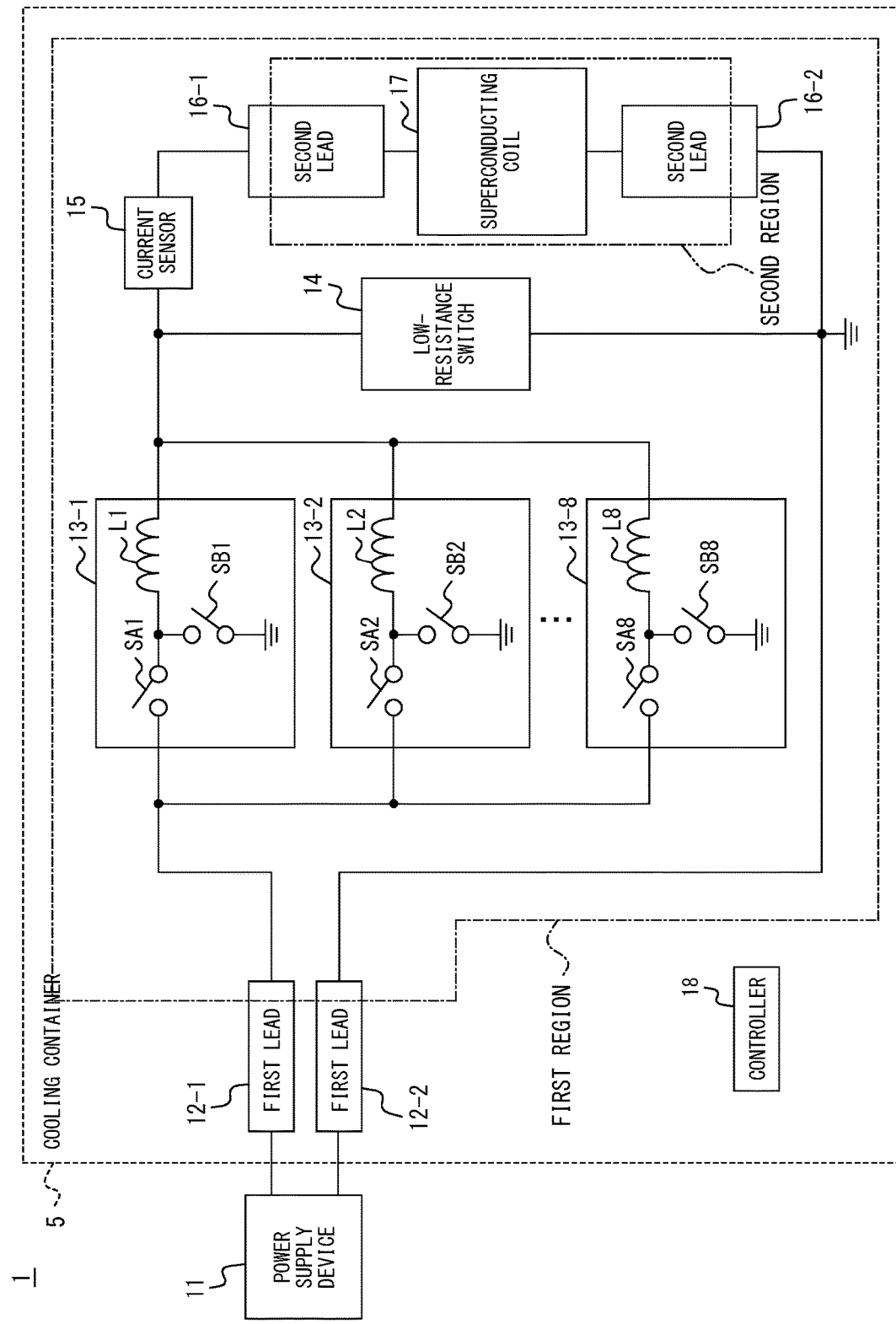
FIG. 6 is a diagram illustrating an example of a structure in which a cooling container has a first region and a second region.

The cooling container 5 may have two regions that differ in cooling temperature setting. For example, the cooling container 5 may have a first region and a second region that differ in cooling temperature setting, as illustrated in FIG. 6. The cooling temperature setting may be lower in the second region than in the first region. As an example, the cooling temperature setting in the first region is about 45 K, and the cooling temperature setting in the second region is about 20 K.

In the case where the cooling temperature setting is lower in the second region than in the first region, the chopper circuits 13 may be installed in the first region, and the superconducting coil 17 may be installed in the second region.

Dividing the cooling temperature setting between two regions in this way makes it unnecessary to cool other circuits to the cryogenic temperature required for cooling the superconducting coil 17, so that the cooling load on the cooling container 5 can be reduced.

As described above, the DC magnetic field superconducting coil power supply device 1 according to this embodiment includes the plurality of chopper circuits 13 connected in parallel between one end of the power supply device 11 and one end of the superconducting coil 17, and the controller 18 that controls the chopper circuits 13. When charging the superconducting coil 17, the controller 18 operates the plurality of chopper circuits 13 in a time-division manner. By operating the plurality of chopper circuits 13 in a time-division manner to charge the superconducting coil 17, it is possible to reduce the maximum current that needs to be supplied by the power supply device 11. For example, in the case where the number of chopper circuits 13 is N, the average current that needs to be supplied by the power supply device 11 can be reduced to about 1/N. The power supply device 11 can thus be implemented as a low-cost power supply device. Reducing the current supplied by the power supply device 11 also enables reduction in size of the first lead 12 connecting the power supply device 11 and the superconducting coil 17, so that the first lead 12 can be implemented as a low-cost current lead. Hence, with the structure of this embodiment, the DC magnetic field superconducting coil power supply device 1 using the superconducting coil 17 can be realized at low cost.

Plurality of Superconducting Coils

The foregoing embodiment describes the structure in which the DC magnetic field superconducting coil power supply device 1 includes one superconducting coil 17 as illustrated in FIG. 1. The following will describe another embodiment in which a DC magnetic field superconducting coil power supply device includes a plurality of superconducting coils 17. First to fifth structure examples in which a DC magnetic field superconducting coil power supply device includes a plurality of superconducting coils 17 will be described below, with reference to FIGS. 7 to 11 respectively.

First structure example

Figure 7:
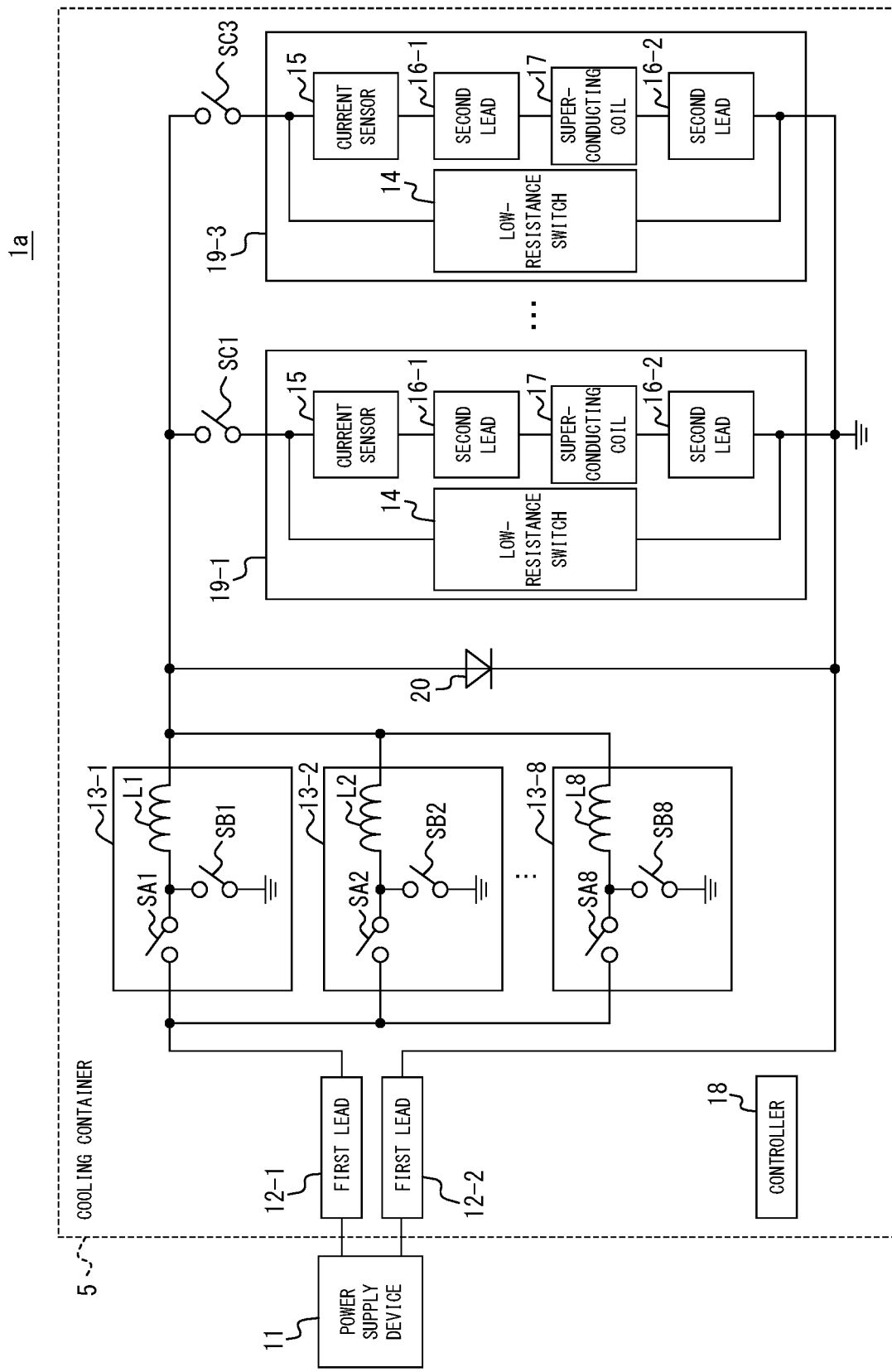
FIG. 7 is a diagram illustrating the structure of a DC magnetic field superconducting coil power supply device according to a first structure example of the present disclosure.

FIG. 7 is a diagram illustrating the structure of a DC magnetic field superconducting coil power supply device 1a according to the first structure example of the present disclosure.

The DC magnetic field superconducting coil power supply device 1a includes a power supply device 11, first leads 12-1 to 12-2, chopper circuits 13-1 to 13-8, a controller 18, superconducting coil units 19-1 to 19-3, selection switches SC1 to SC3, and a freewheeling diode 20.

The description of the DC magnetic field superconducting coil power supply device 1a according to the first structure example mainly focuses on the differences from the DC magnetic field superconducting coil power supply device 1 illustrated in FIG. 1 while omitting the parts common to the DC magnetic field superconducting coil power supply device 1 illustrated in FIG. 1 as appropriate.

Hereafter, the superconducting coil units 19-1 to 19-3 may be simply referred to as "superconducting coil units 19" when there is no need to distinguish them.

Hereafter, the selection switches SC1 to SC3 may be simply referred to as "selection switches SC" when there is no need to distinguish them.

Each superconducting coil unit 19 includes a low-resistance switch 14, a current sensor 15, second leads 16-1 and 16-2, and a superconducting coil 17. The low-resistance switch 14, the current sensor 15, the second leads 16-1 and 16-2, and the superconducting coil 17 included in each superconducting coil unit 19 have the same functions as the low-resistance switch 14, the current sensor 15, the second leads 16-1 to 16-2, and the superconducting coil 17 illustrated in FIG. 1.

In detail, in the DC magnetic field superconducting coil power supply device 1a according to the first structure example, a plurality of sets each including the low-resistance switch 14, the current sensor 15, the second leads 16-1 to 16-2, and the superconducting coil 17 illustrated in FIG. 1 are connected in parallel.

The DC magnetic field superconducting coil power supply device 1a according to the first structure example thus includes a plurality of superconducting coils 17 connected in parallel.

Although this embodiment describes the structure in which three superconducting coil units 19-1 to 19-3 are connected in parallel as an example, the number of superconducting coil units 19 connected in parallel is not limited to three. The number of superconducting coil units 19 connected in parallel may be any number of two or more. The superconducting coil unit 19-2 is omitted in FIG. 7.

Each superconducting coil unit 19 is connected to the plurality of chopper circuits 13-1 to 13-8 via a selection switch SC. Specifically, the superconducting coil unit 19-1 is connected to the plurality of chopper circuits 13-1 to 13-8 via the selection switch SC-1. The superconducting coil unit 19-2 is connected to the plurality of chopper circuits 13-1 to 13-8 via the selection switch SC-2. The superconducting coil unit 19-3 is connected to the plurality of chopper circuits 13-1 to 13-8 via the selection switch SC-3.

The freewheeling diode 20 connects a node between the plurality of chopper circuits 13-1 to 13-8 and the plurality of selection switches SC1 to SC3 and the ground.

The controller 18 can select which superconducting coil 17 is to be charged, by turning on one selection switch SC out of the selection switches SC1 to SC3 and turning off the other selection switches SC.

For example, when the controller 18 turns on the selection switch SC1 and turns off the selection switches SC2 to SC3, the superconducting coil 17 in the superconducting coil unit 19-1 connected to the selection switch SC1 is charged.

In the case where the controller 18 turns on one of the selection switches SC to select the superconducting coil 17 to be charged, the subsequent operation of charging the superconducting coil 17 is the same as the operation of charging the superconducting coil 17 in the DC magnetic field superconducting coil power supply device 1 illustrated in FIG. 1.

The controller 18 can select which superconducting coil 17 is to be charged by switching the selection switch SC to be turned on. Here, if the DC magnetic field superconducting coil power supply device 1a does not include the freewheeling diode 20, overvoltage can occur when switching the selection switch SC.

Overvoltage can occur in the case where the current flowing through the chopper circuits 13-1 to 13-8 and the current flowing through the superconducting coil 17 selected by the selection switch SC do not match. Overvoltage can also occur in the case where, in a state in which the current flowing through the chopper circuits 13-1 to 13-8 has a significant value, none of the superconducting coils 17 is selected by the selection switch SC.

In the case where such a current mismatch occurs, the freewheeling diode 20 can suppress overvoltage by providing a destination for the differential current.

If the DC magnetic field superconducting coil power supply device 1a includes the freewheeling diode 20 as illustrated in FIG. 7, the current flowing through the chopper circuits 13-1 to 13-8 matches the sum of the current flowing through the superconducting coil 17 selected by the selection switch SC and the current flowing through the freewheeling diode 20. The freewheeling diode 20 can thus suppress overvoltage when the selection switch SC is switched.

Second Structure Example

Figure 8:
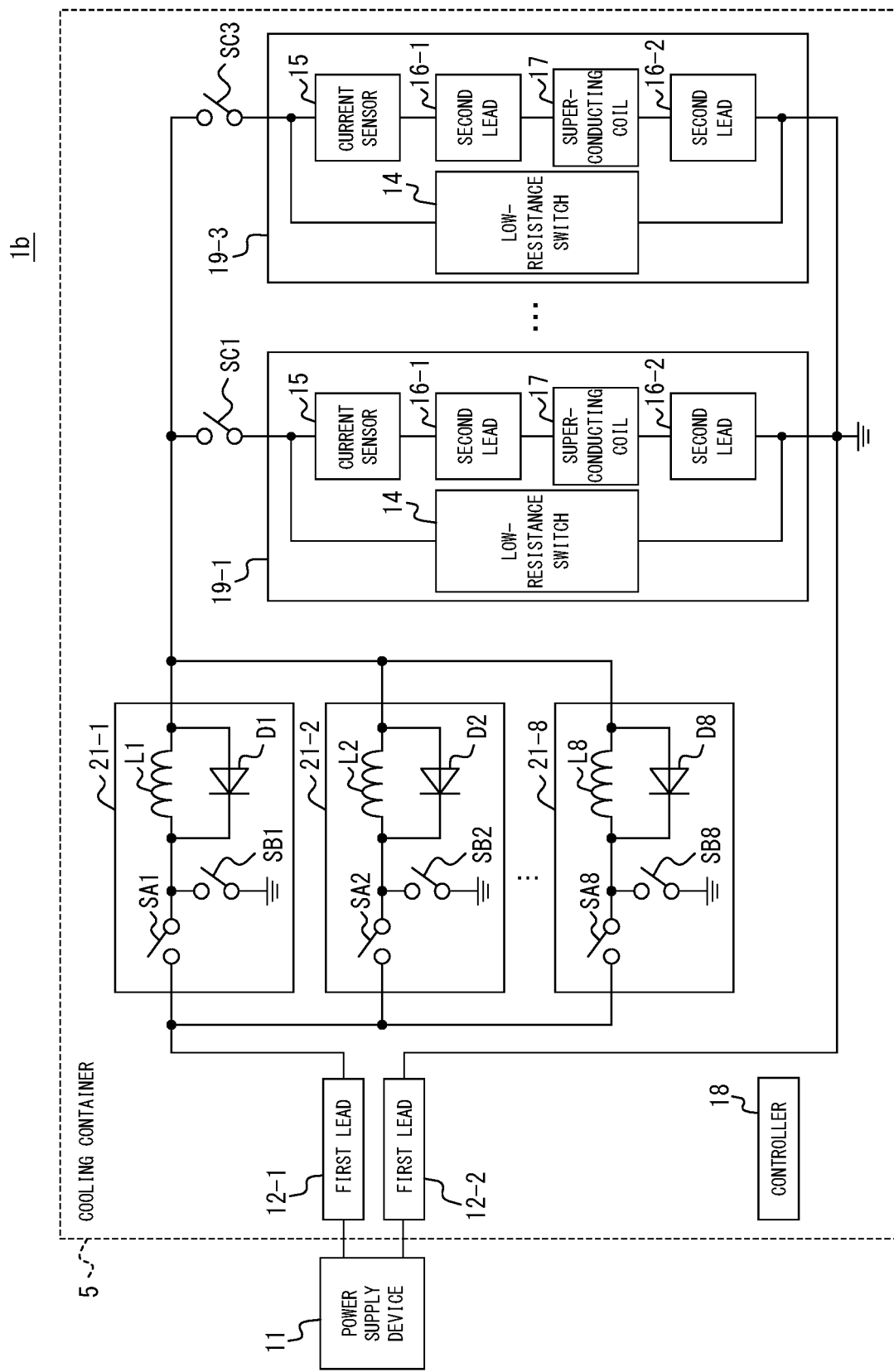
FIG. 8 is a diagram illustrating the structure of a DC magnetic field superconducting coil power supply device according to a second structure example of the present disclosure.

FIG. 8 is a diagram illustrating the structure of a DC magnetic field superconducting coil power supply device 1b according to the second structure example of the present disclosure.

The DC magnetic field superconducting coil power supply device 1b includes a power supply device 11, first leads 12-1 to 12-2, chopper circuits 21-1 to 21-8, a controller 18, superconducting coil units 19-1 to 19-3, and selection switches SC1 to SC3.

The DC magnetic field superconducting coil power supply device 1b according to the second structure example differs from the DC magnetic field superconducting coil power supply device 1a illustrated in FIG. 7 in that, instead of the freewheeling diode 20, freewheeling diodes D1 to D8 are included in the chopper circuits 21-1 to 21-8 respectively.

As illustrated in FIG. 8, for example, the chopper circuit 21-1 includes the freewheeling diode D1 connected in parallel with the inductor L1. The chopper circuits 21-2 to 21-8 respectively include the freewheeling diodes D2 to D8 connected in parallel with the inductors L2 to L8, as with the chopper circuit 21-1.

In the case where the chopper circuits 21-1 to 21-8 respectively include the freewheeling diodes D1 to D8, too, overvoltage can be suppressed when the selection switch SC is switched, as in the first structure example.

Third Structure Example

Figure 9:
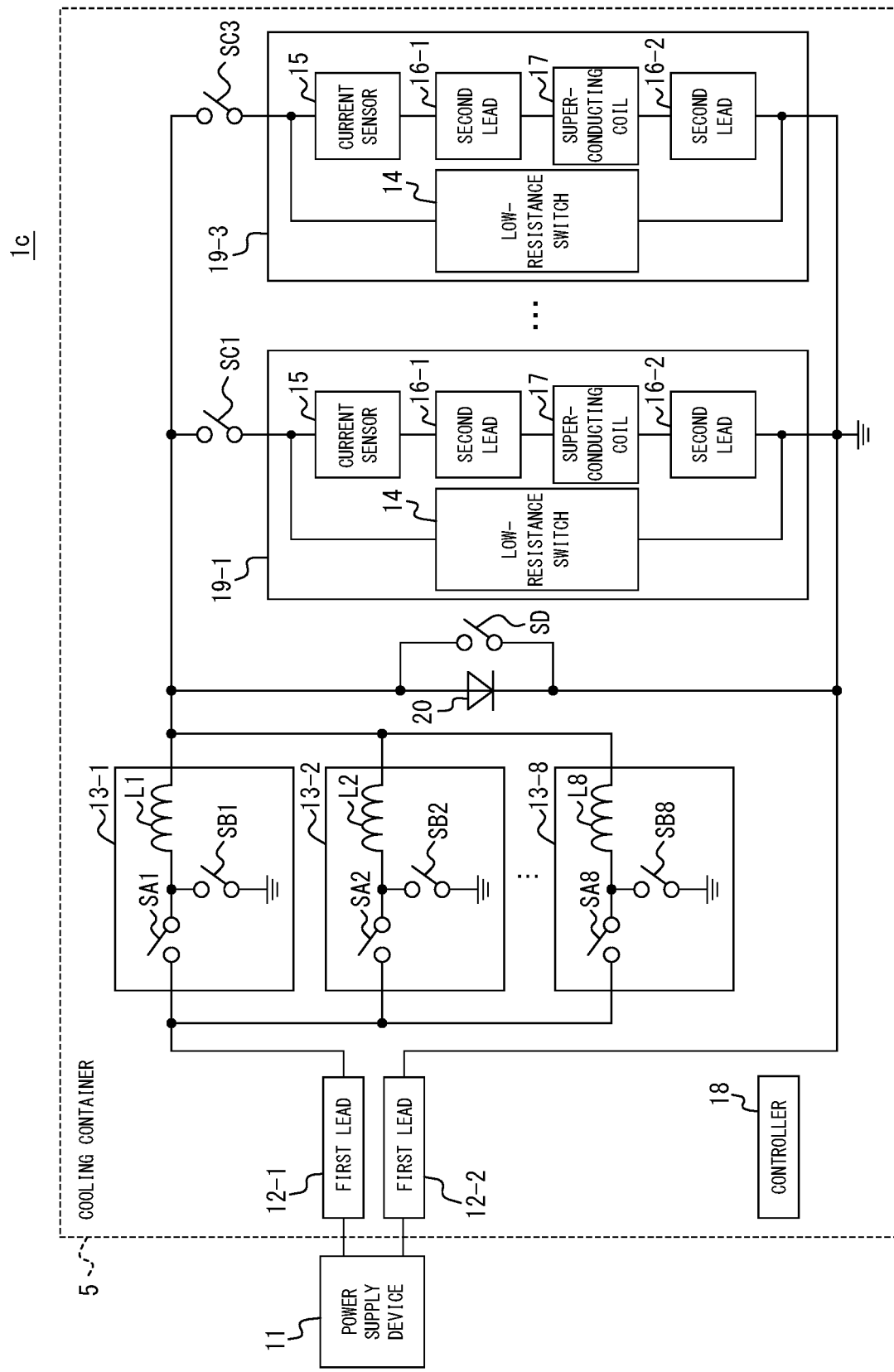
FIG. 9 is a diagram illustrating the structure of a DC magnetic field superconducting coil power supply device according to a third structure example of the present disclosure.

FIG. 9 is a diagram illustrating the structure of a DC magnetic field superconducting coil power supply device 1c according to the third structure example of the present disclosure.

The DC magnetic field superconducting coil power supply device 1c includes a power supply device 11, first leads 12-1 to 12-2, chopper circuits 13-1 to 13-8, a controller 18, superconducting coil units 19-1 to 19-3, selection switches SC1 to SC3, a freewheeling diode 20, and a third switch SD.

The DC magnetic field superconducting coil power supply device 1c according to the third structure example differs from the DC magnetic field superconducting coil power supply device 1a illustrated in FIG. 7 in that the third switch SD connected in parallel with the freewheeling diode 20 is further included.

With the inclusion of the third switch SD, the DC magnetic field superconducting coil power supply device 1c can, when the selection switch SC is switched, prevent the differential current caused by a current mismatch from being reduced as a result of passing through the freewheeling diode 20. More specifically, when the selection switch SC is switched, as a result of turning on the third switch SD in the time during which energization is performed so that the differential current will pass through the freewheeling diode 20, the differential current passes through the third switch SD lower in loss than the freewheeling diode 20, with it being possible to suppress the reduction of the differential current due to the freewheeling diode 20. If the reduction of the differential current is suppressed, the differential current can be used to some extent for charging the superconducting coil 17 selected next by the selection switch SC.

Moreover, with the inclusion of the third switch SD, the DC magnetic field superconducting coil power supply device 1c can, when recharging the superconducting coil 17, suppress temporary reduction of the current flowing through the superconducting coil 17 at the start of recharging the superconducting coil 17.

The foregoing effects of the DC magnetic field superconducting coil power supply device 1c will be described in comparison with the DC magnetic field superconducting coil power supply device 1a illustrated in FIG. 7.

In the DC magnetic field superconducting coil power supply device 1a illustrated in FIG. 7, when charging of all of the three superconducting coils 17 included in the superconducting coil units 19-1 to 19-3 is completed, the selection switches SC1 to SC3 are all off, and the three low-resistance switches 14 included in the superconducting coil units 19-1 to 19-3 are all on. Hence, in each of the superconducting coil units 19-1 to 19-3, current flows in a closed loop connecting the low-resistance switch 14, the current sensor 15, the second lead 16-1, the superconducting coil 17, and the second lead 16-2.

Moreover, in a state in which at least a certain time has passed after the completion of the charging of all of the three superconducting coils 17 included in the superconducting coil units 19-1 to 19-3, no current flows through the chopper circuits 13-1 to 13-8.

For example, in the case where the value of current required to flow through the superconducting coil 17 is 300 A, the superconducting coil 17 needs to be recharged if the current decreases to 298 A, for example.

In the case of recharging the superconducting coil 17 included in the superconducting coil unit 19-1, the controller 18 turns off the low-resistance switch 14 included in the superconducting coil unit 19-1 and turns on the selection switch SC1.

Here, part of the current flowing through the superconducting coil 17 included in the superconducting coil unit 19-1 is distributed to the chopper circuits 13-1 to 13-8. This causes the current flowing through the superconducting coil 17 included in the superconducting coil unit 19-1 to be slightly reduced.

To avoid this, there is a method of precharging the chopper circuits 13-1 to 13-8 via the freewheeling diode 20 before recharging the superconducting coil 17. However, loss upon energizing the freewheeling diode 20 occurs.

The DC magnetic field superconducting coil power supply device 1c illustrated in FIG. 9 includes the third switch SD in parallel with the freewheeling diode 20 in order to reduce such loss upon energizing the freewheeling diode 20. The operation of the DC magnetic field superconducting coil power supply device 1c will be described below.

In the DC magnetic field superconducting coil power supply device 1c illustrated in FIG. 9, when charging of all of the three superconducting coils 17 included in the superconducting coil units 19-1 to 19-3 is completed, the selection switches SC1 to SC3 are all off, and the three low-resistance switches 14 included in the superconducting coil units 19-1 to 19-3 are all on. Hence, in each of the superconducting coil units 19-1 to 19-3, current flows in a closed loop connecting the low-resistance switch 14, the current sensor 15, the second lead 16-1, the superconducting coil 17, and the second lead 16-2.

Moreover, in a state in which at least a certain time has passed after the completion of the charging of all of the three superconducting coils 17 included in the superconducting coil units 19-1 to 19-3, no current flows through the chopper circuits 13-1 to 13-8.

In the case of recharging the superconducting coil 17 included in the superconducting coil unit 19-1, the controller 18 first turns on the third switch SD.

Subsequently, the controller 18 turns on the first switch SA1 to charge the inductor L1 in the chopper circuit 13-1. After charging the inductor L1, the controller 18 turns off the first switch SA1 and turns on the second switch SB1 to hold the current flowing through the inductor L1, and turns on the first switch SA2 to charge the inductor L2 in the chopper circuit 13-2. The controller 18 repeats such operation to charge the inductors L1 to L8 in the chopper circuits 13-1 to 13-8.

After completing the charging of the inductors L1 to L8, the controller 18 turns off the third switch SD. The controller 18 also turns off the low-resistance switch 14 included in the superconducting coil unit 19-1, and turns on the selection switch SC1.

Thus, when the selection switch SC1 is turned on in a state in which the chopper circuits 13-1 to 13-8 are precharged, the current flowing through the superconducting coil 17 included in the superconducting coil unit 19-1 is not distributed to the chopper circuits 13-1 to 13-8 but the superconducting coil 17 is recharged by the precharged chopper circuits 13-1 to 13-8. Hence, the DC magnetic field superconducting coil power supply device 1c can suppress reduction of the current flowing through the superconducting coil 17 when recharging the superconducting coil 17.

Fourth Structure Example

Figure 10:
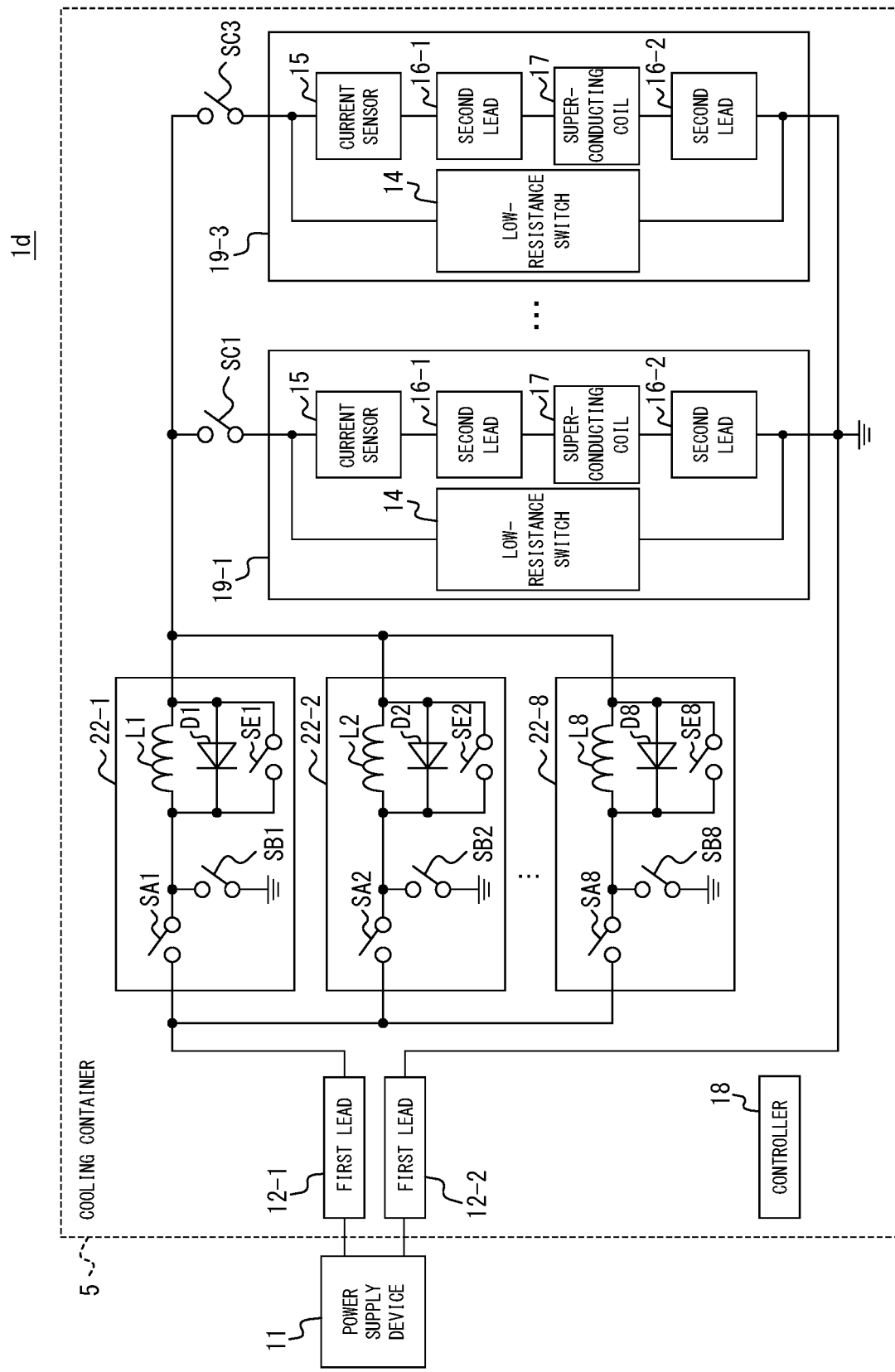
FIG. 10 is a diagram illustrating the structure of a DC magnetic field superconducting coil power supply device according to a fourth structure example of the present disclosure.

FIG. 10 is a diagram illustrating the structure of a DC magnetic field superconducting coil power supply device Id according to the fourth structure example of the present disclosure.

The DC magnetic field superconducting coil power supply device 1b includes a power supply device 11, first leads 12-1 to 12-2, chopper circuits 22-1 to 22-8, a controller 18, superconducting coil units 19-1 to 19-3, and selection switches SC1 to SC3.

The DC magnetic field superconducting coil power supply device 1d according to the fourth structure example differs from the DC magnetic field superconducting coil power supply device 1c illustrated in FIG. 9 in that, instead of the freewheeling diode 20, freewheeling diodes D1 to D8 are included in the chopper circuits 22-1 to 22-8 respectively. The DC magnetic field superconducting coil power supply device Id according to the fourth structure example also differs from the DC magnetic field superconducting coil power supply device 1c illustrated in FIG. 9 in that, instead of the third switch SD, fourth switches SE1 to SE8 are included in the chopper circuits 22-1 to 22-8 respectively.

As illustrated in FIG. 10, for example, the chopper circuit 22-1 includes the freewheeling diode D1 and the fourth switch SE1 connected in parallel with the inductor L1. The chopper circuits 22-2 to 22-8 respectively include the freewheeling diodes D2 to D8 and the fourth switches SE2 to SE8 connected in parallel with the inductors L2 to L8, as with the chopper circuit 22-1.

In the case where the chopper circuits 22-1 to 22-8 respectively include the freewheeling diodes D1 to D8 and the fourth switches SE1 to SE8, too, the same effects as in the third structure example can be achieved.

Fifth Structure Example

Figure 11:
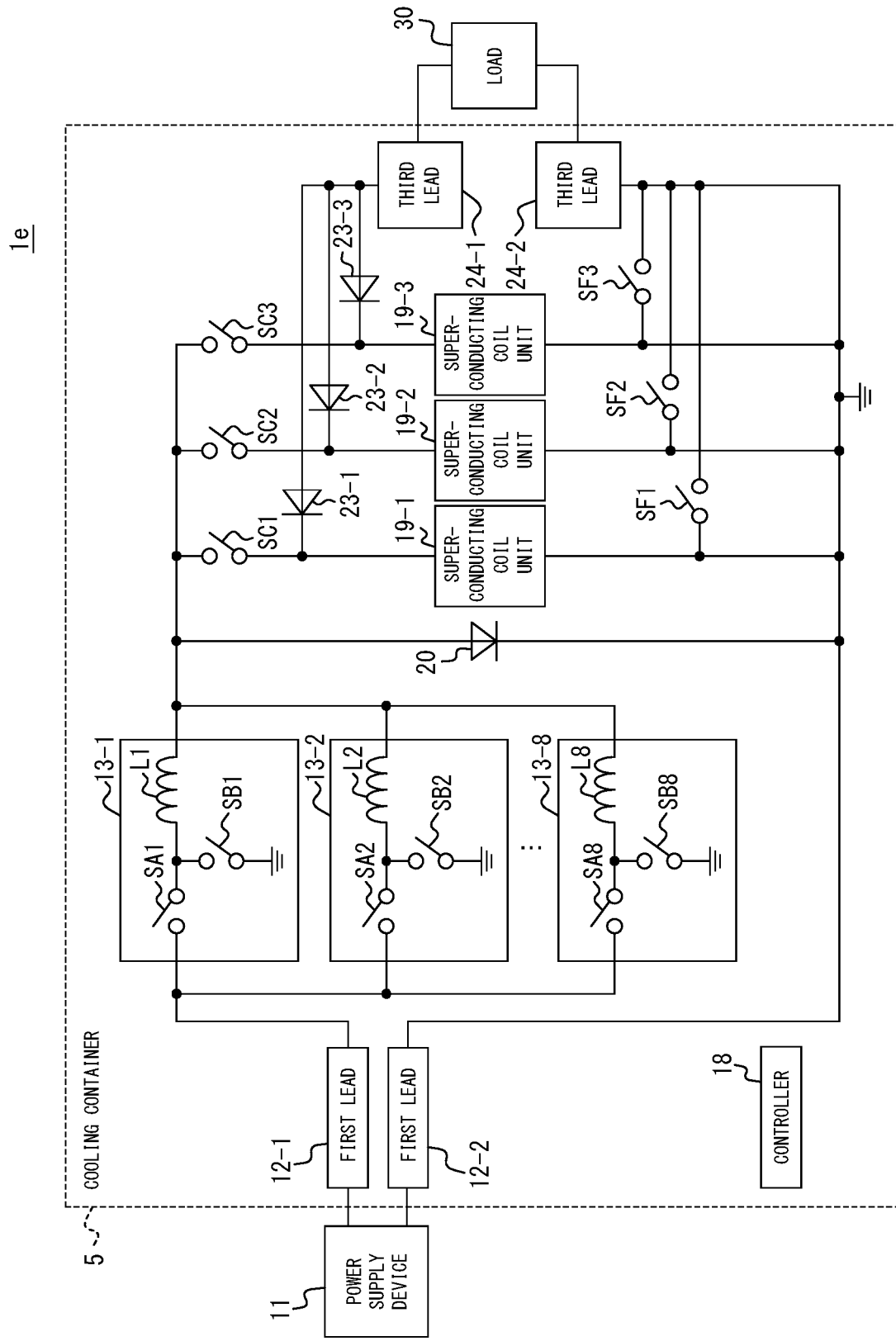
FIG. 11 is a diagram illustrating the structure of a DC magnetic field superconducting coil power supply device according to a fifth structure example of the present disclosure.

FIG. 11 is a diagram illustrating the structure of a DC magnetic field superconducting coil power supply device 1e according to the fifth structure example of the present disclosure.

The DC magnetic field superconducting coil power supply device 1e includes a power supply device 11, first leads 12-1 to 12-2, chopper circuits 13-1 to 13-8, a controller 18, superconducting coil units 19-1 to 19-3, selection switches SC1 to SC3, a freewheeling diode 20, current blocking diodes 23-1 to 23-3, fifth switches SF1 to SF3, and third leads 24-1 to 24-2.

Hereafter, the current blocking diodes 23-1 to 23-3 may be simply referred to as "current blocking diodes 23" when there is no need to distinguish them.

Hereafter, the fifth switches SF1 to SF3 may be simply referred to as "fifth switches SF" when there is no need to distinguish them.

Hereafter, the third leads 24-1 and 24-2 may be simply referred to as "third leads 24" when there is no need to distinguish them.

Each superconducting coil unit 19 illustrated in FIG. 11 includes a low-resistance switch 14, a current sensor 15, second leads 16-1 to 16-2, and a superconducting coil 17 as in each superconducting coil unit 19 illustrated in FIG. 7, although not illustrated in FIG. 11.

The DC magnetic field superconducting coil power supply device 1e according to the fifth structure example differs from the DC magnetic field superconducting coil power supply device 1a illustrated in FIG. 7 in that the current blocking diodes 23-1 to 23-3, the fifth switches SF1 to SF3, and the third leads 24-1 to 24-2 are included.

A load 30 illustrated in FIG. 11 is a load provided outside the DC magnetic field superconducting coil power supply device 1e. The load 30 may be any load that is supplied with power from the DC magnetic field superconducting coil power supply device 1e and consumes the power.

Each current blocking diode 23 connects one end of the superconducting coil 17 included in the corresponding superconducting coil unit 19 and one end of the load 30 via the third lead 24-1. More specifically, the current blocking diode 23-1 connects one end of the superconducting coil 17 included in the superconducting coil unit 19-1 and one end of the load 30 via the third lead 24-1. The current blocking diode 23-2 connects one end of the superconducting coil 17 included in the superconducting coil unit 19-2 and one end of the load 30 via the third lead 24-1. The current blocking diode 23-3 connects one end of the superconducting coil 17 included in the superconducting coil unit 19-3 and one end of the load 30 via the third lead 24-1.

Each fifth switch SF connects the other end of the superconducting coil 17 included in the corresponding superconducting coil unit 19 and the other end of the load 30 via the third lead 24-2. More specifically, the fifth switch SF1 connects the other end of the superconducting coil 17 included in the superconducting coil unit 19-1 and the other end of the load 30 via the third lead 24-2. The fifth switch SF2 connects the other end of the superconducting coil 17 included in the superconducting coil unit 19-2 and the other end of the load 30 via the third lead 24-2. The fifth switch SF3 connects the other end of the superconducting coil 17 included in the superconducting coil unit 19-3 and the other end of the load 30 via the third lead 24-2.

The third leads 24 are conductors through which current can flow. The third leads 24 may be, for example, normal-conducting current leads.

The controller 18 can charge all of the three superconducting coils 17 included in the superconducting coil units 19-1 to 19-3 by sequentially turning on the selection switches SC1 to SC3.

In a state in which all of the three superconducting coils 17 are charged, the controller 18 turns off the selection switches SC1 to SC3.

In this state, when the controller 18 turns on all of the fifth switches SF1 to SF3, the currents flowing through the three superconducting coils 17 included in the superconducting coil units 19-1 to 19-3 are synthesized and supplied to the load 30. For example, when a current of 300 A is flowing through one superconducting coil 17, the DC magnetic field superconducting coil power supply device 1e can supply a current of 900 A to the load 30. When supplying the current to the load 30, the low-resistance switch 14 in each superconducting coil unit 19 is turned off.

In this case, the current required to be supplied by the power supply device 11 is the current obtained by dividing the current of 900 A flowing through the load 30 by the product of the number of chopper circuits 13 and the number of superconducting coil units 19. That is, in the example illustrated in FIG. 11, 900 A/(8×3)=37.5 A. More generally, the power supply device 11 is only required to be capable of supplying a current that is 1/(N×M) times the current supplied to the load 30, where N is the number of chopper circuits 13 and M is the number of superconducting coil units 19.

Although the DC magnetic field superconducting coil power supply device 1e illustrated in FIG. 11 includes the current blocking diodes 23-1 to 23-3, the fifth switches SF1 to SF3, and the third leads 24-1 to 24-2 in addition to the structure of the DC magnetic field superconducting coil power supply device 1a illustrated in FIG. 7, the structure of the DC magnetic field superconducting coil power supply device 1e is not limited to such. The DC magnetic field superconducting coil power supply device 1e may include the current blocking diodes 23-1 to 23-3, the fifth switches SF1 to SF3, and the third leads 24-1 to 24-2 in addition to the DC magnetic field superconducting coil power supply device 1b illustrated in FIG. 8. The DC magnetic field superconducting coil power supply device 1e may include the current blocking diodes 23-1 to 23-3, the fifth switches SF1 to SF3, and the third leads 24-1 to 24-2 in addition to the DC magnetic field superconducting coil power supply device 1c illustrated in FIG. 9. The DC magnetic field superconducting coil power supply device 1e may include the current blocking diodes 23-1 to 23-3, the fifth switches SF1 to SF3, and the third leads 24-1 to 24-2 in addition to the DC magnetic field superconducting coil power supply device 1d illustrated in FIG. 10.

The DC magnetic field superconducting coil power supply device 1e may include a switch connected in parallel with the current blocking diode 23.

The present disclosure is not limited to the foregoing embodiments. For example, a plurality of blocks in any of the block diagrams may be combined, or a single block in any of the block diagrams may be divided. Other modifications are also possible without departing from the scope of the present disclosure.

For example, although the foregoing embodiments describe an example in which eight chopper circuits 13 are connected in parallel, the number of chopper circuits 13 connected in parallel may be any number of two or more.

For example, although the foregoing embodiments describe an example in which the controller 18 is installed inside the cooling container 5, the controller 18 may be installed outside the cooling container 5. Alternatively, the controller 18 may be dispersedly located such that part of the controller 18 is installed inside the cooling container 5 and the other part of the controller 18 is installed outside the cooling container 5.

INDUSTRIAL APPLICABILITY

The DC magnetic field superconducting coil power supply device according to the present disclosure is suitable for use in generating DC magnetic fields using superconducting coils.

REFERENCE SIGNS LIST 1, 1a, 1b, 1c, 1d, 1e DC magnetic field superconducting coil power supply device 5 cooling container
11 power supply device
12 first lead
13 chopper circuit
14 low-resistance switch
15 current sensor
16 second lead
17 superconducting coil
18 controller
19 superconducting coil unit
20 freewheeling diode
21 chopper circuit
22 chopper circuit
23 current blocking diode
24 third lead
30 load
141 MOSFET
142 diode
D1 to D8 freewheeling diode
L1 to L8 inductor
SA1 to SA8 first switch
SB1 to SB8 second switch
SC1 to SC3 selection switch
SD third switch
SE1 to SE8 fourth switch
SF1 to SF3 fifth switch

The invention claimed is:

1. A DC magnetic field superconducting coil power supply device comprising:
a superconducting coil;
a power supply device configured to supply a DC voltage;
a plurality of chopper circuits connected in parallel between one end of the power supply device and one end of the superconducting coil; and
a controller configured to control the plurality of chopper circuits,
wherein the controller is configured to operate the plurality of chopper circuits in a time-division manner when charging the superconducting coil,
wherein each of the plurality of chopper circuits comprises:
a first switch and an inductor configured to connect the one end of the power supply device and the one end of the superconducting coil in series; and
a second switch configured to connect a node between the first switch and the inductor and a ground, and
wherein the ground is a node connecting an other end of the power supply device and an other end of the superconducting coil.

2. The DC magnetic field superconducting coil power supply device according to claim 1, wherein the controller is configured to operate each of the plurality of chopper circuits once during one cycle.

3. The DC magnetic field superconducting coil power supply device according to claim 1, wherein the first switch and the second switch are each a MOSFET.

4. The DC magnetic field superconducting coil power supply device according to claim 1, wherein the controller is configured to adjust a duty ratio when operating each of the plurality of chopper circuits.

5. The DC magnetic field superconducting coil power supply device according to claim 1, further comprising
a low-resistance switch configured to short-circuit both ends of the superconducting coil,
wherein the controller is configured to turn on the low-resistance switch to short-circuit both ends of the superconducting coil, when a current flowing through the superconducting coil is greater than or equal to a predetermined threshold.

6. The DC magnetic field superconducting coil power supply device according to claim 5, wherein the low-resistance switch has a structure in which a plurality of parallel circuits each composed of a MOSFET and a diode are connected in parallel.

7. The DC magnetic field superconducting coil power supply device according to claim 1, wherein the superconducting coil and the plurality of chopper circuits are installed inside a cooling container.

8. The DC magnetic field superconducting coil power supply device according to claim 7, wherein the cooling container has a first region and a second region that is lower in cooling temperature setting than the first region,
the plurality of chopper circuits are installed in the first region, and
the superconducting coil is installed in the second region.

9. The DC magnetic field superconducting coil power supply device according to claim 1, further comprising
two first leads connected to respective two output terminals of the power supply device.

10. A DC magnetic field superconducting coil power supply device comprising:
a superconducting coil;
a power supply device configured to supply a DC voltage;
a plurality of chopper circuits connected in parallel between one end of the power supply device and one end of the superconducting coil; and
a controller configured to control the plurality of chopper circuits,
wherein the controller is configured to operate the plurality of chopper circuits in a time-division manner when charging the superconducting coil,
wherein the superconducting coil comprises a plurality of superconducting coils connected in parallel, and
the DC magnetic field superconducting coil power supply device further comprises:
a plurality of selection switches each connected between a different one of the plurality of superconducting coils and the plurality of chopper circuits; and
a freewheeling diode configured to connect the ground and a node between the plurality of chopper circuits and the plurality of selection switches.

11. The DC magnetic field superconducting coil power supply device according to claim 10, further comprising
a third switch connected in parallel with the freewheeling diode.

12. The DC magnetic field superconducting coil power supply device according to claim 10, further comprising:
a plurality of current blocking diodes each configured to connect one end of a different one of the plurality of superconducting coils and one end of a load provided outside the DC magnetic field superconducting coil power supply device; and
a plurality of fifth switches each configured to connect an other one of the different one of the plurality of superconducting coils and an other one of the load.

13. A DC magnetic field superconducting coil power supply device comprising:
a superconducting coil;
a power supply device configured to supply a DC voltage;
a plurality of chopper circuits connected in parallel between one end of the power supply device and one end of the superconducting coil; and
a controller configured to control the plurality of chopper circuits,
wherein the controller is configured to operate the plurality of chopper circuits in a time-division manner when charging the superconducting coil,
wherein the superconducting coil comprises a plurality of superconducting coils connected in parallel,
the DC magnetic field superconducting coil power supply device further comprises
a plurality of selection switches each connected between a different one of the plurality of superconducting coils and the plurality of chopper circuits, and
each of the plurality of chopper circuits further comprises a freewheeling diode connected in parallel with the inductor.

14. The DC magnetic field superconducting coil power supply device according to claim 13, further comprising
a fourth switch connected in parallel with the freewheeling diode.

* * * * *